United States Patent [19]

Chou

[11] Patent Number: 5,956,216
[45] Date of Patent: Sep. 21, 1999

[54] MAGNETIC STORAGE HAVING DISCRETE ELEMENTS WITH QUANTIZED MAGNETIC MOMENTS

[75] Inventor: Stephen Y. Chou, Golden Valley, Minn.

[73] Assignee: Regents of the University of Minnesota, Minneapolis, Minn.

[21] Appl. No.: 08/762,781

[22] Filed: Dec. 10, 1996

Related U.S. Application Data

[62] Division of application No. 08/448,807, May 24, 1995, Pat. No. 5,820,769.

[51] Int. Cl.$^6$ .............................. G11B 5/74; G11B 23/00
[52] U.S. Cl. .................................................. 360/131
[58] Field of Search ........................ 360/131, 135; 216/22; 204/192.1; 427/129–130; 430/320, 324

[56] References Cited

U.S. PATENT DOCUMENTS

| | | | |
|---|---|---|---|
| 3,743,842 | 7/1973 | Smith et al. | 250/320 |
| 4,310,743 | 1/1982 | Seliger | 219/121 EB |
| 4,314,894 | 2/1982 | Schmelzer | 204/192 |
| 4,325,779 | 4/1982 | Rossetti | 156/651 |
| 4,383,026 | 5/1983 | Hall | 430/325 |
| 4,450,358 | 5/1984 | Reynolds | 250/492.1 |
| 4,498,009 | 2/1985 | Reynolds | 250/452.1 |
| 4,516,253 | 5/1985 | Novak | 378/34 |
| 4,552,615 | 11/1985 | Amendola et al. | 158/659 |
| 4,576,678 | 3/1986 | Shibata | 156/643 |
| 4,606,788 | 8/1986 | Moran | 156/656 |
| 4,731,155 | 3/1988 | Napoli et al. | 156/643 |
| 4,832,790 | 5/1989 | Rossetti | 156/651 |
| 5,045,438 | 9/1991 | Adachi | 430/321 |
| 5,277,749 | 1/1994 | Griffith et al. | 156/643 |
| 5,445,707 | 8/1995 | Toyama et al. | 216/22 |
| 5,527,663 | 6/1996 | Togawa et al. | 216/22 |
| 5,761,166 | 6/1998 | Sedlmayr et al. | 369/59 |

FOREIGN PATENT DOCUMENTS

| | | | |
|---|---|---|---|
| 62-114121 | 5/1987 | Japan | 360/131 |
| 401196749 | 8/1989 | Japan . | |
| 91/17565 | 11/1991 | WIPO . | |

OTHER PUBLICATIONS

Broere, et al., "250–A Linewidths with PMMA Electron Resist", *Appl. Phys. Lett.*, 33, 392–394, (Sep. 1, 1978).

Chou, S.Y., "Patterned Magnetic Nanostructures and Quantized Magnetic Disks", *Proceedings of the IEEE*, 85, 652–671, (Apr. 1997).

Chou, S.Y., "Quantized Magnetic Disks", *J. Magn. Soc. Japan*, 21, 1023–1032, (1997).

(List continued on next page.)

*Primary Examiner*—George J. Letscher
*Attorney, Agent, or Firm*—Schwegman, Lundberg, Woessner, and Kluth, P.A.

[57] ABSTRACT

A magnetic storage includes a non-magnetic substrate. A plurality of discrete single magnetic domain elements formed of a magnetic material separated by nonmagnetic materials are carried on the non-magnetic substrate. Each single magnetic domain element has the same size, shape and has, without an external magnetic field, two quantized magnetization values. The two magnetization values are of substantially equal magnitude but of differing vector directions. The plurality of single domain elements are adapted for magnetic storage of information based upon direction of the magnetization vector. Each single magnetic domain element is used to store a bit of binary information. Writing each bit becomes to flip the quantified magnetic moment directions. Each bit can be tracked individually. The switching field of each bit can be controlled by controlling the size and shape anisotropy of each bit. Methods of fabricating the magnetic storage medium include obtaining the non-magnetic substrate and forming the plurality of single magnetic domain elements on the substrate.

31 Claims, 8 Drawing Sheets

OTHER PUBLICATIONS

Fischer, et al., "10 nm Electron Bean Lithography and sub–50 nm Overlay Using a Modified Scanning Electron Microscope", *Appl. Phys. Lett.*, 62, 2989–2991, (Jun. 7, 1993).

Hara, et al., "An Alignment Technique Using Diffracted Moire Signals", *J. Vac. Sci. Technol. B*, 7, 1977–1979, (Nov./Dec. 1989).

Harmening, et al., "Molding of Threedimensional Microstructures by the Liga Process", *Proceedings IEEE: Micro Electro Mechanical Systems*, Travemunde, Germany, 202–207, (Feb. 4–7, 1992).

Li, et al., "Molding of Plastic Components Using Micro–EDM Tools", *13th IEEE/CHMT International Electronics Manufacturing Technology Symposium*, Baltimore, MD, 145–149, (Sep. 28–30, 1992).

Nomura, et al., "Moire Alignment Technique for the Mix and Match Lithographic System", *J. Vac. Sci. Technol. B*, 6, 394–398, (Jan./Feb. 1988).

Ilesanmi Adesida et al., "The 38th International Symposium on Electron, Ion and Photon Beams", *Abstract Book*, (1994).

Stephen Y. Chou, et al., "Single–Domain Magnetic Pillar Array of 35 NM Diameter and 65 GBITS/IN2 Density for Ultra–High Density Magnetic Storage", *The 6th Joint MMM–Intermag Conference, Abstracts*, 322, (1994).

Stephen Y. Chou, et al., "Study of Nanoscale magneti structures fabricated using electron–beam lithography and quantum magnetic disk", *American Vacuum Society*, vol. 12, No. 6, 3695–3698, (1994).

Dimitris E. Ioannou, et al., "A Fine–Line–Spot–Position (FLSP) sensitive photodetector", *IEEE Transactions on Electron Devices*, vol. ED–34, No. 4, 778–781, (1987).

Peter R. Krauss, et al., "Fabrication of Single–domain magnetic pillar array of 35 nm diameter and 65 Gbits/in2 density", *American Vacuum Society*, vol. 12, No. 6, 3639–3642, (1994).

Eiichi Sano, "Two–Diemensional Ensemble Monte Carlo Calculation of Pulse Responses of Submicrometer GaAs Metal–Semiconductor–Metal Photodetectors", *IEEE Transactions on Electron Devices*, vol. 38, No. 9, 2075–2081, (1991).

MAGNETIC STORAGE HAVING DISCRETE ELEMENTS WITH QUANTIZED MAGNETIC MOMENTS

This is a division of application Ser. No. 08/448,807, filed May 24, 1995, now U.S. Pat. No. 5,820,769.

This invention was partially sponsored by the United States Government under Grant No. N00014-93-1-0648 awarded by the Advance Research Projects Agency and Grant No. N00014-93-0256 awarded by the Office of Naval Research. The Government has certain rights in the invention.

BACKGROUND OF THE INVENTION

The present invention relates to storing information. More specifically, the present invention relates to a magnetic storage.

In a conventional magnetic disk storage, information is stored in a continuous magnetic thin film that is over a rigid nonmagnetic disk. Each bit of information is stored by magnetizing a small area on the thin magnetic film using a write head that will provide a suitable magnetic field. The magnetic moment, the area and the location of that small area present a bit of binary information, and they must be defined precisely to allow a magnetic sensor, called a read head, to retrieve the written information.

The conventional magnetic disk storage suffers several drawbacks that hinder realization of ultrahigh density storage. First, the magnetic moments of a continuous film have an infinite number of possibilities. Therefore, the write head must write very precisely in defining the magnetic moment, the location, and the area of each bit on the magnetic thin film. A slight error in doing so will not only create the error in the bit, but also could miswrite the neighboring bits, causing errors in reading. Second, a continuous film is very good in linking exchange interaction and magnetostatic interaction that are between the bits. When the bits are very close, writing of one bit could lead to writing of its neighbors because of the exchange interaction and magnetostatic interaction between the bits. Thirdly, the continuous magnetic film makes many bits have no physical boundaries between them, making the reading and writing in a blind fashion. This means that the location of each bit is found by calculating the movements of the disk and the write or read heads, instead of physically sensing the actual bit location. Fourth, the continuous magnetic film also makes the boundary of two bits with different magnetization ragged, creating noise in reading.

As demand for more information continues to grow, the need for high density data storage will keep increasing. To achieve ultrahigh density magnetic storage, the drawbacks of the conventional magnetic storage mentioned above must be overcome.

SUMMARY OF THE INVENTION

The present invention presents a new paradigm in magnetic storage and its fabrication processes.

It is an objective of the present invention to use a new paradigm to overcome the drawbacks of previous magnetic storage and to achieve ultrahigh storage density.

In the present invention, the continuous magnetic film used in a conventional magnetic disk is abandoned. In its place, the present invention uses a plurality of discrete elements of magnetic materials. Each discrete magnetic element is separated from other elements by nonmagnetic materials; the spacing is large enough that exchange interaction between two neighboring elements is either greatly reduced or eliminated. Each magnetic element has the same size and the same shape, and is made of the same magnetic materials as the other elements. The elements are regularly arranged on the substrate. Each magnetic element has a small size and a preferred shape anisotropy so that, without an external magnetic field, the magnetic moments of each discrete magnetic element will be automatically aligned to one axis of the element. This means that the magnetic moments of each discrete magnetic element is quantized and has only two states: the same in magnitude but in two opposite directions. Such a discrete magnetic element is called a single magnetic domain element. The size, area and location of each bit were predetermined in the fabrication. Each direction of the quantized magnetic moments of a single magnetic domain element is used to represent one value of a binary bit. A writing operation in this invention is simply to flip the magnetic moment direction of the single magnetic domain element. A reading operation in this invention is to sense the quantized magnetic moments. The long axis of each element, and therefore of their magnetization, can be parallel to the surface of the medium, i.e., longitudinal recording, or perpendicular to the surface, i.e., perpendicular recording.

The magnetic storage consists of magnetic storage medium, write heads, and read heads.

The magnetic storage media are fabricated by obtaining a non-magnetic substrate. Single magnetic domain elements are formed on the non-magnetic substrate. In one embodiment, the single-domain elements are adapted for vertical recording.

DETAILED DESCRIPTION OF THE PREFERRED EMBODIMENTS

As used herein, the term "single magnetic domain" refers to magnetic moments of a magnetic element which automatically align in one direction in the absence of an external magnetic field. However, the magnetic element of a single magnetic domain can be made of either single crystal or polycrystal or amorphous materials.

Figure 1A:
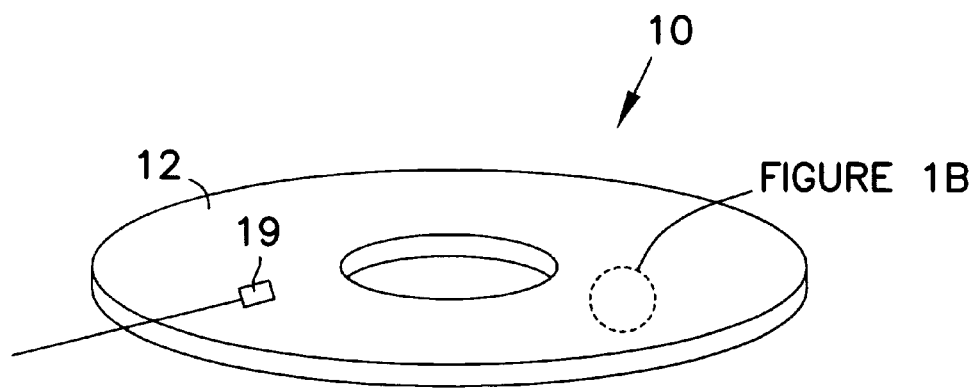
FIGS. 1A–1B show a magnetic storage medium system.
Figure 1B:
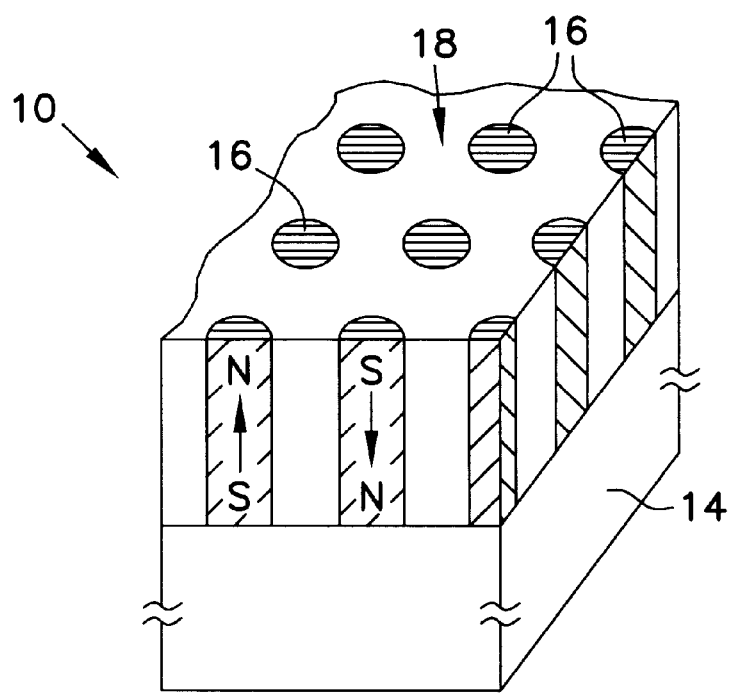

FIGS. 1A–1B show magnetic storage medium (disk) 10 in accordance with one aspect of the invention. Disk 10 includes surface 12 which stores magnetically encoded information. FIGS. 1A–1B also show an enlarged portion of disk 10 having non-magnetic substrate 14, single magnetic domain pillars 16 and non-magnetic material 18. Pillars 16 are of shape and dimension such that they have two quantized magnetization values. These two magnetizations are of opposite vector directions which are perpendicular to the disk surface but of similar vector magnitude. A read/write head 19 is positioned over surface 12 for reading and writing information.

Figure 2A:
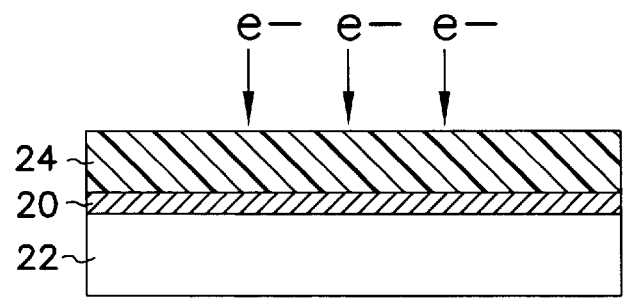
FIGS. 2A through 2D show steps in accordance with one method of making the storage medium of FIG. 1.
Figure 2B:
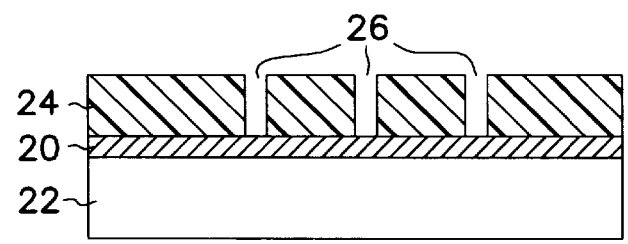
Figure 2C:
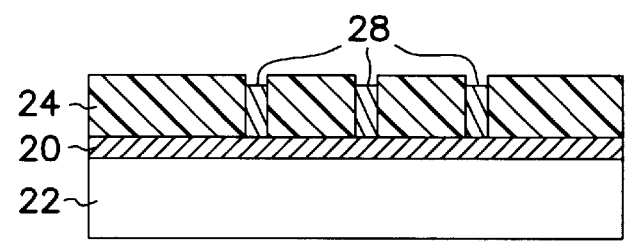
Figure 2D:
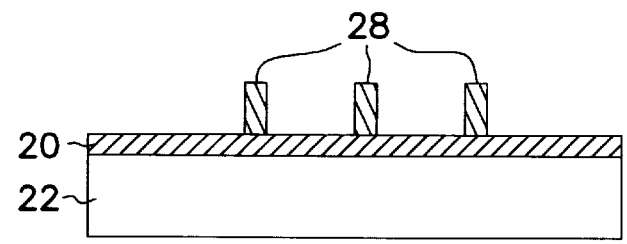

FIGS. 2A through 2D show steps used to fabricate magnetic storage medium 10. A thin gold (or Ti) plating base 20 is deposited on a non-magnetic silicon substrate 22. A high resolution electron beam photoresist, polymethyl methacrylate (PMMA) 24, is spun onto substrate 22. Depending upon the desired pillar height, the thickness of PMMA 24 is typically 130 nm; however, 720 nm thick PMMA 24 may also be used. Dot arrays 26 with diameters from 35 nm to 40 nm and spacings from 50 nm to 1000 nm are exposed in the PMMA using a high resolution electron beam lithography system with a beam diameter of 4 nm. The exposed PMMA 24 is then developed in a cellosolve and methanol solution creating a template for the electroplating process, as shown in FIG. 2. The sample is immersed in a nickel sulfamate type plating bath and nickel is electroplated into template openings 26 until the nickel thickness is about the template thickness. This forms Ni pillars 28, shown in FIG. 2C. The plating rate, which is a function of plating current, template diameter and template thickness, is calibrated for about 45 nm/min. After electroplating, the PMMA template 24 is removed as shown in FIG. 2D.

Figure 3:
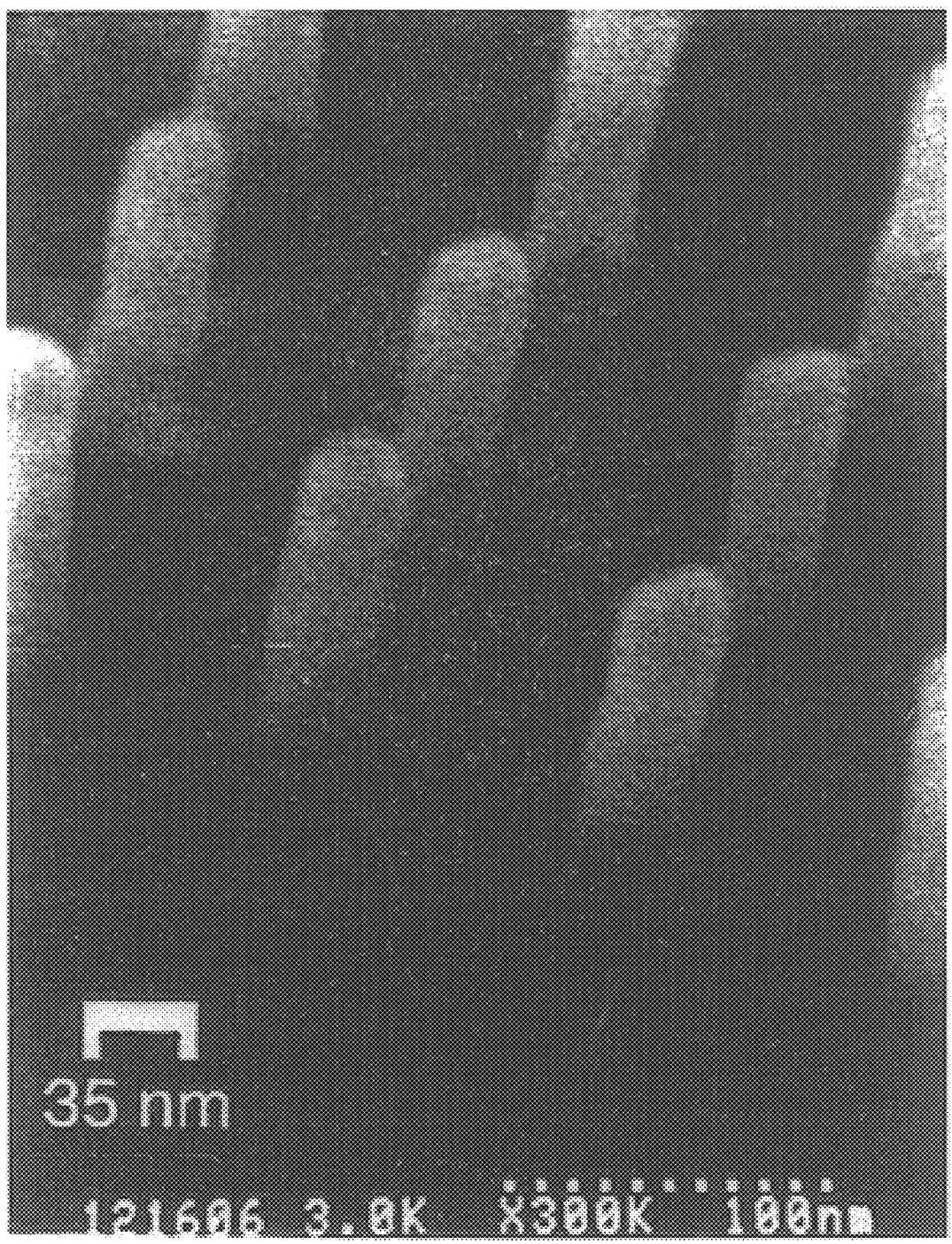
FIG. 3 is an SEM micrograph of a single magnetic domain pillar array.

After fabrication, pillars 28 were examined using a scanning electron microscope (SEM) to verify the pillar dimensions. The resulting nickel pillars 28 were uniform and had the desired shape anisotropy. FIG. 3 shows an SEM micrograph of a pillar array having a diameter of 35 nm, a height of 120 nm and therefore an aspect ratio of 3.4. The pillar array has a period (spacing) of 100 nm, and thus has a magnetic storage density of 65 Gbits/in$^2$ which is two orders of magnitude higher than typical state-of-the-art storage. The pillars have a cylindrical shape with very smooth side walls.

Figure 4A:
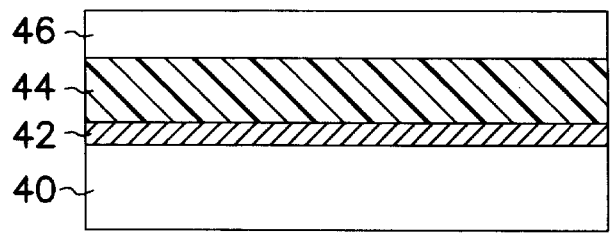
FIGS. 4A through 4D show another method of forming the magnetic storage medium of FIG. 1.
Figure 4B:
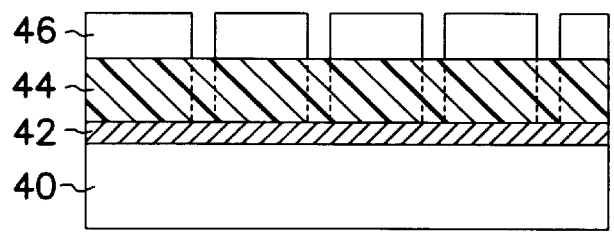
Figure 4C:
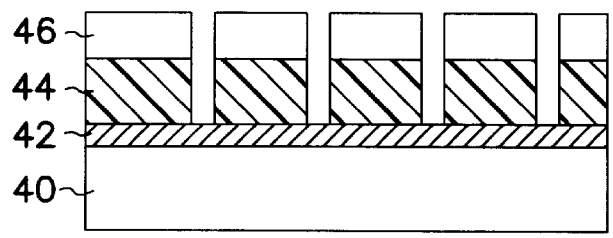
Figure 4D:
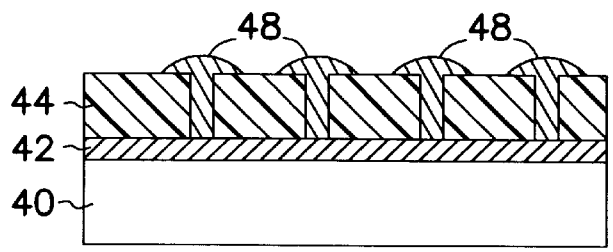

FIGS. 4A through 4D show steps in another method of forming single magnetic domain elements. In FIG. 4A, a non-magnetic substrate 40 has layers of gold (or Ti) 42, SiO$_2$ 44 and PMMA 46 deposited thereon. In FIG. 4B, PMMA layer 46 has been exposed using E-beam lithography and was developed. Next, using PMMA as an etch mask, the SiO$_2$ layer 44 is subjected to reactive ion etching, forming cavities in SiO$_2$ layer 44. Following the reactive ion etch, PMMA layer 46 is chemically stripped and nickel 48 is electroplated onto the substrate through the cavities, as shown in FIG. 4D. Nickel 48 includes "bumps" where it has grown above SiO$_2$ layer 44. Following the deposition of nickel layer 48, the surface of the substrate is polished chemically and mechanically with a diamond slurry polish, for example, into a smooth surface with variations less than 5 Å. This yields disk 10 as shown in the inset in FIG. 1.

Figure 5A:
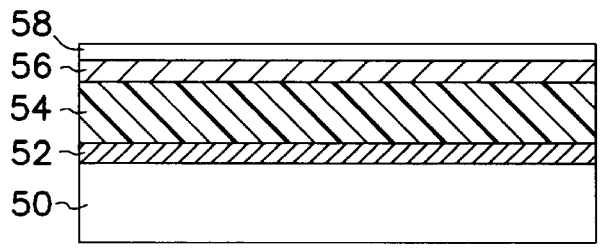
FIGS. 5A through 5F show another method of forming the magnetic storage medium of FIG. 1.
Figure 5B:
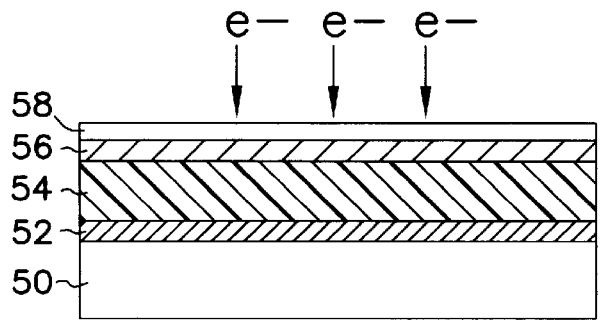
Figure 5C:
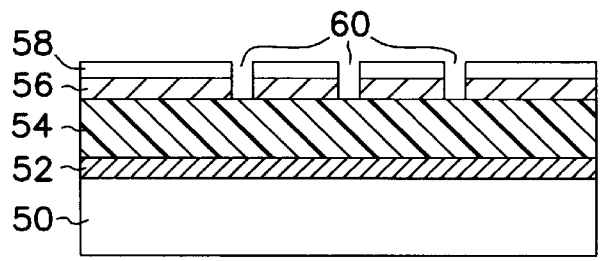
Figure 5D:
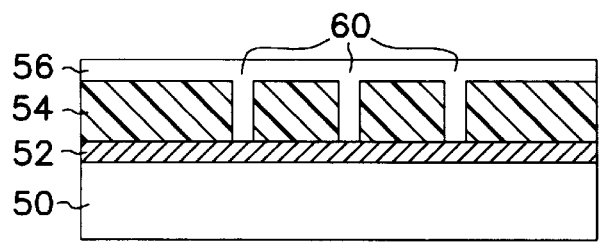
Figure 5E:
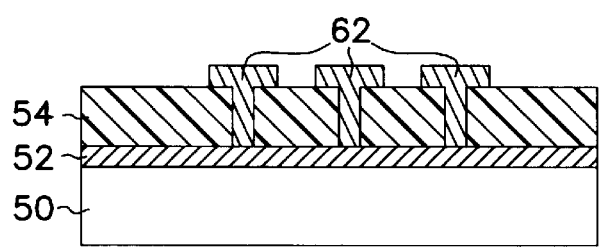
Figure 5F:
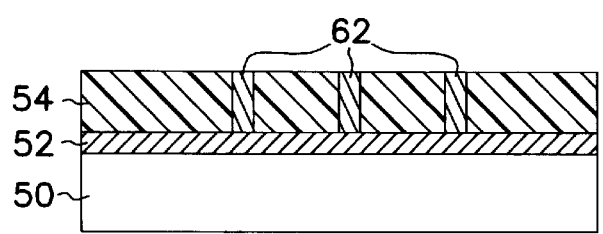

FIGS. 5A through 5F show steps in accordance with another method of forming single magnetic domain elements. In FIG. 5A, non-magnetic substrate 50 has plating base 52, SiO$_2$ layer 54, chrome layer 56 and PMMA layer 58 deposited thereon. As shown in FIG. 5B, layer 58 is exposed to electron beam lithography and developed to form vias therethrough. Using the PMMA as a mask, a chrome etch is applied to form vias 60 in chrome layer 56, shown in FIG. 5C. Vias 60 are extended to plating base 52 in FIG. 5D using a reactive ion etching technique or ion milling. The PMMA layer 58 and chrome layer 56 are removed chemically. A nickel electroplating step forms magnetic elements 62 shown in FIG. 5E. At FIG. 5F, the substrate has been exposed to a chemical or mechanical polishing process in which the surfaces of element 62 are lapped back and are congruent with the surface of layer 56. This forms the flat surface shown in FIG. 5F which includes single magnetic domain element 62 formed therein.

Figure 6A:
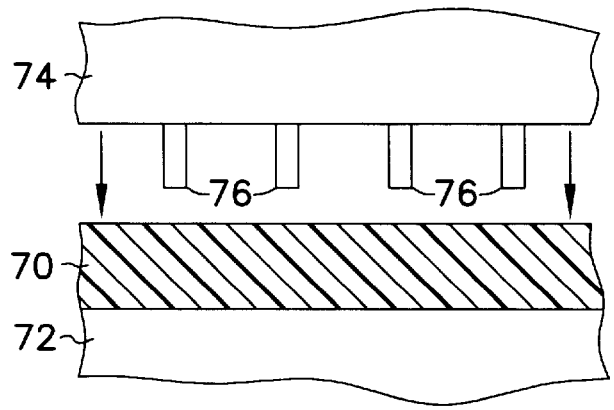
FIGS. 6A through 6D show steps in accordance with another embodiment.
Figure 6B:
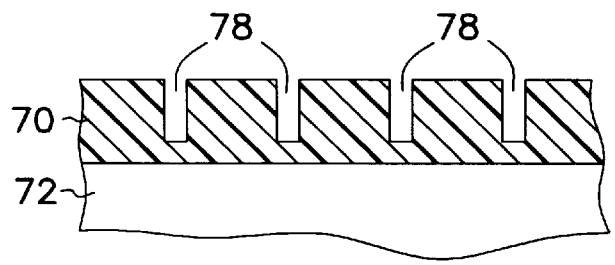
Figure 6C:
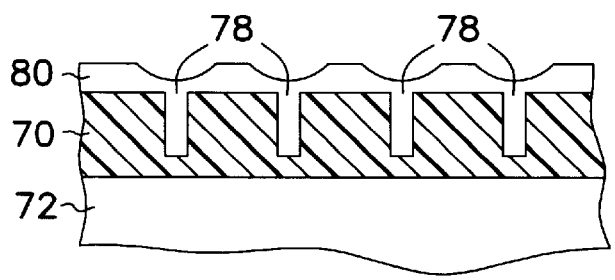
Figure 6D:
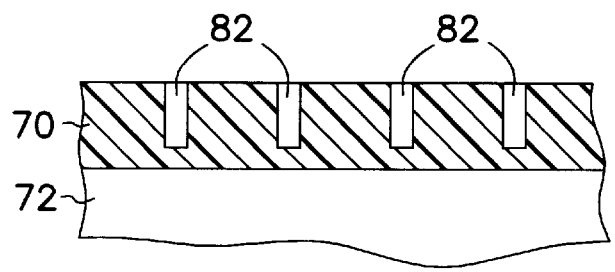

FIGS. 6A through 6D show another method of forming the storage medium shown in FIG. 1. In FIG. 6A, a polymer layer 70 covers a non-magnetic substrate 72. Opposite polymer layer 70 is mold 74 which includes pillars 76. Mold 74 is moved toward polymer layer 70 and forms an imprint on layer 70. This imprint forms a plurality of recesses (or vias) 78 as shown in FIG. 6B. To form this imprint, polymer layer 70 should be at a temperature which allows pillars 76 to form recesses 78. Typically, this temperature will be slightly below the melting temperature of polymer layer 70. In one embodiment, pillars 76 of mold 74 are formed of glass. Layer 70 is then exposed to a chemical vapor deposition process (CVD) in which magnetic material 80 such as nickel is deposited as shown in FIG. 6C. Material 80 flows into recesses 78. Material 80 is then exposed to a chemical or mechanical polishing step in which material 80 is removed from the surface to expose layer 70. This leaves a substantially flat surface for layer 70 containing single magnetic domain elements 82. The method described in the steps in FIGS. 6A through 6D is well suited for large scale fabrication.

It should be understood by those skilled in the art that any appropriate fabrication technique may be used. Another example includes forming a mask in material, such as photoresist, using a mold. Then the imprint of the molding will be transferred to the non-magnetic material by etching techniques.

If each pillar is used to store one bit of information, such a nanoscale pillar array storage has a rather different paradigm than the conventional magnetic storage. In conventional storage, each bit of information is stored over a number of magnetic grains in a continuous magnetic film which have a broad distribution in grain size, spacing and magnetization direction. These distributions will result in the variation of the total magnetization of each bit stored and give rise to noise in reading. In the single domain pillar array, on the other hand, each bit is stored in a pillar which has only two quantized magnetization values: up or down in direction but equal in magnitude. Therefore, noise for each bit is small.

Figure 7:
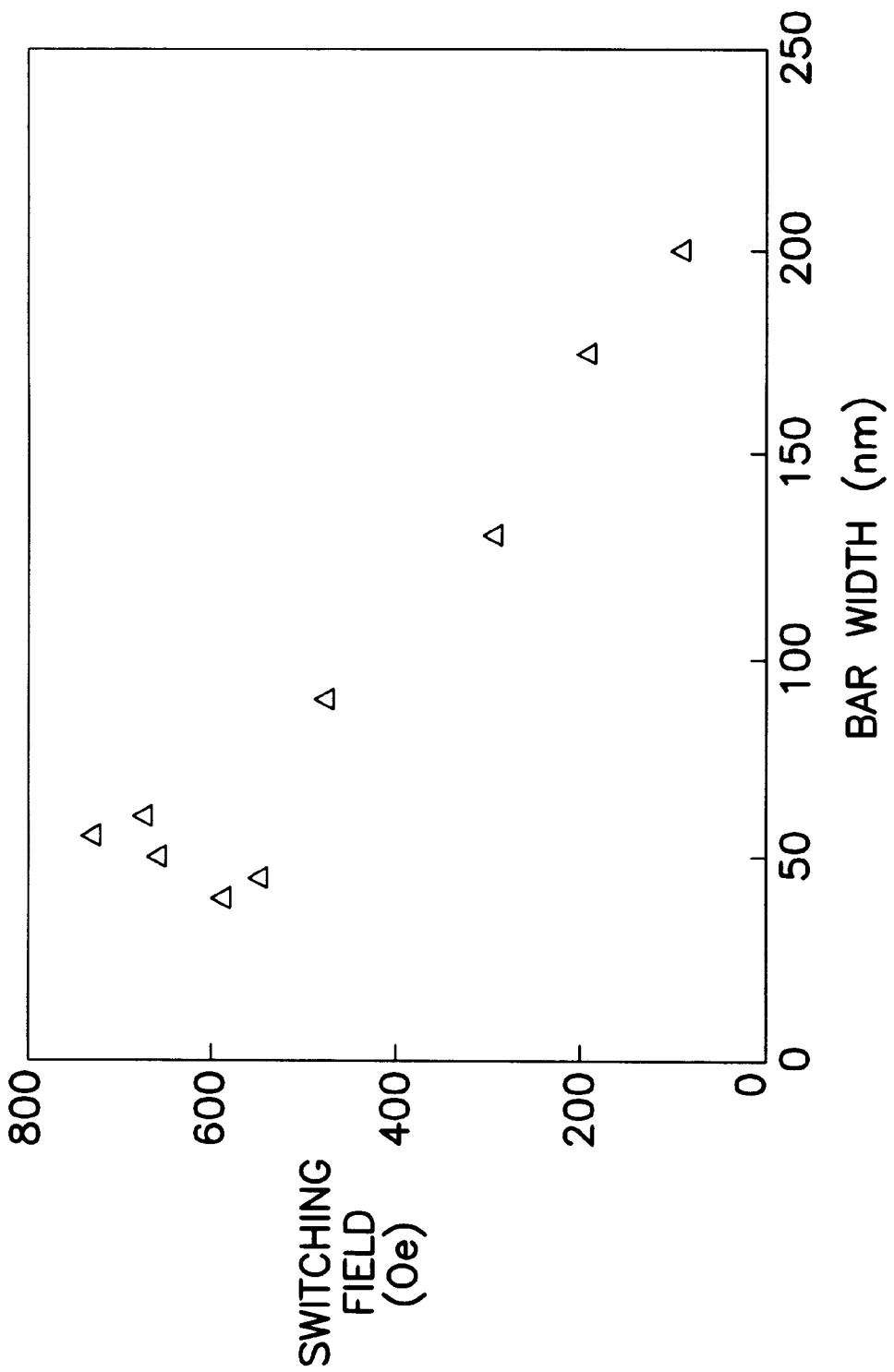
FIG. 7 is a diagram showing a relationship between switching field strength (Oe) versus bar width (nm) for a nickel bar of 1 $\mu$m length and 35 $\mu$m thickness.

The magnetic field needed to switch the direction of magnetic moment of each discrete element can be controlled by controlling the size and shape anisotropy of each element. FIG. 7 is a graph of switch field strength versus bar width for a nickel pillar of 1 μm length and 35 μm height, in accordance with one embodiment.

Figure 8:
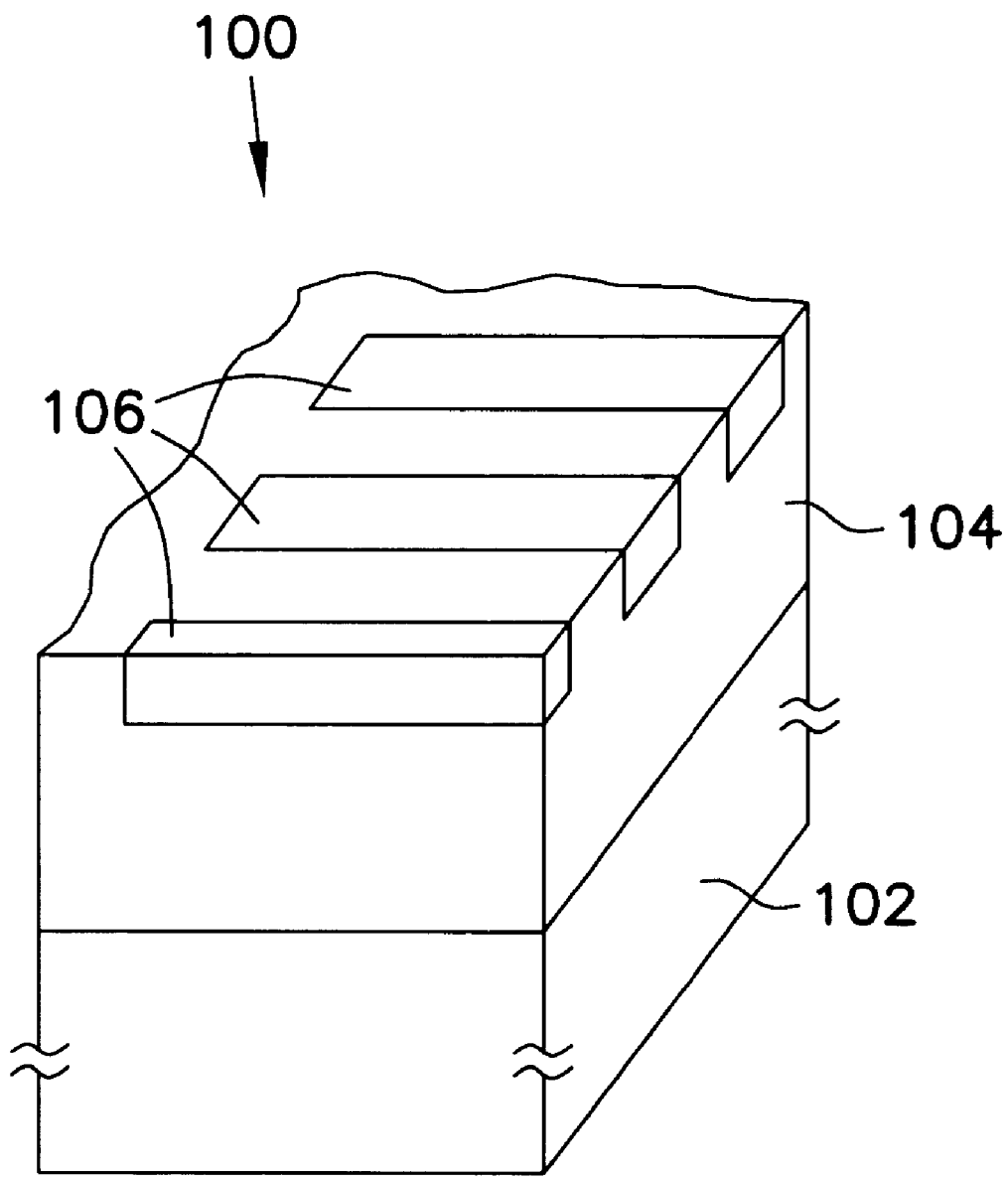
FIG. 8 is a cutaway perspective view of a storage medium adapted for longitudinal recording.

FIG. 8 is a cross-sectional perspective view of magnetic storage medium 100 in accordance with another embodiment. Storage medium 100 is adapted for horizontal or lateral recording. Medium 100 includes non-magnetic substrate 102 carrying non-magnetic material 104. Material 104 carries a plurality of single magnetic domain bars 106. Bars 106 are adapted for horizontal recording. The magnetization vectors of bars 106 are parallel with the long axis of bars 106 and are capable of having two discrete states, as discussed above. Bars 106 are formed using any of the processes discussed herein.

Methods which may be able to characterize the nanoscale magnetic pillars include magnetic force microscopy (MFM) scanning electron microscopy with polarization analysis (SEMPA) and magnetooptical Kerr effect microscopy (MOKE). MFM measures the magnetic field gradient using a tiny magnetic dipole moment which is scanning across the sample. SEMPA analysis forms images by scanning a focused electron beam across a sample and detecting the spin polarization of secondary electrons. The magnitude and direction of the secondary electron's spin polarization is directly proportional to the magnitude and direction of the magnetization of the sample being scanned. MOKE analysis measures the magnetization of the pillars versus the magnetic field by detecting the rotation of polarization state of light reflected from a ferromagnetic sample. Measurement using a magnetic force microscope has shown that each pillar is a single magnetic domain.

The advantages of disk 10 over the conventional disks are apparent. First, the writing process in disk 10 is greatly simplified, resulting in much lower noise and lower error rate and allowing much higher density. In disk 10, the writing process does not define the location, shape and magnetization value of a bit, but just simply flips the quantized magnetization orientation of a pre-patterned single domain magnetic structure. The writing can be perfect, even though the head slightly deviates from the intended bit location and partially overlaps with other bits, as long as the head flips only the magnetization of the intended bit. In the conventional magnetic disk, the writing process must define the location, shape and magnetization of a bit. If the head deviates from the intended location, the head will write to part of the intended bit and part of the neighboring bits.

Secondly, the QMD can greatly reduce the crosstalk between the neighboring bits, offering much higher storage density. This is because crosstalk is due to the exchange and magnetostatic interaction bits linked by continuous thin film Isolating each bit with non-magnetic material will greatly cut off these interactions and, therefore, crosstalk.

Thirdly, disk 10 can track every bit individually. In contrast, in a conventional disk each individual bit cannot be located. This is because in disk 10 each bit is separated from others by nonmagnetic material, but in the conventional disk many bits are connected. The individual-bit-tracking ability allows precise positioning, lower error rate and therefore ultra-high density storage.

Finally, reading in disk 10 is much less jittery than that in a conventional disk. The reason is that in a conventional disk the boundary between bits is ragged and not well defined, but in disk 10 each bit is defined with nanometer precision (which can be less than a grain in size) and is well separated from each other.

Typical dimensions of the single magnetic domain element are that for vertical recording, it has a length of from about 0.1 $\mu$m to about 2.0 $\mu$m, and a diameter of about 100 Å to about 5,000 Å, and that for longitudinal (horizontal) recording, it has a width of about 50 Å to about 0.5 $\mu$m, and a length of about 200 Å to about 1.0 $\mu$m. Suitable materials include nickel, cobalt, iron and their alloys.

Although the present invention has been described with reference to preferred embodiments, workers skilled in the art will recognize that changes may be made in form and detail without departing from the spirit and scope of the invention. For example, the single domain element may be arranged for horizontal (longitudinal) recording, or other materials or fabrication techniques may be employed. Further, the cross section of a quantum element can be other than the rectangular shape shown in the figures.

What is claimed is:

1. A magnetic storage system for storing magnetically encoded information, comprising:

a non-magnetic substrate;

a plurality of discrete single-domain magnetic storage elements over the non-magnetic substrate;

wherein the plurality of discrete magnetic elements are embedded in nonmagnetic materials, each discrete magnetic element having a shape anisotropy, spacing, and dimension to only allow its magnetization to one or the other of only two quantized magnetization values of differing magnetization vector directions and of substantially equal magnetization vector magnitude in the absence of an external magnetic field, and each discrete magnetic element is used to represent a binary bit of information based upon the magnetization vector direction and substantially independent of magnetization vector magnitude;

a write head that flips the magnetization of one of the plurality of discrete magnetic elements to store a binary bit of information; and a read head that reads the binary bit of information by sensing the quantized magnetic value from the one of the plurality of discrete magnetic elements.

2. The magnetic storage system of claim 1 wherein each discrete magnetic element has a size and shape substantially equal to those of other of the plurality of discrete magnetic elements, and that is well controlled and precisely oriented during fabrication.

3. The magnetic storage system of claim 1 wherein each discrete magnetic element is made of magnetic materials substantially equal to those of other of the plurality of discrete magnetic elements.

4. The magnetic storage system of claim 1 wherein the plurality of discrete magnetic elements comprise multiple layers of ferromagnetic materials or alloys.

5. The magnetic storage system of claim 1 wherein each discrete magnetic element has a small size and preferred shape anisotropy such that each of the discrete magnetic elements is a single magnetic domain thus providing the two magnetic moments of the element which tend to align along a long axis of the element in the absence of an external magnetic field.

6. The magnetic storage system of claim 1 wherein each discrete magnetic element is separated from other discrete magnetic elements by nonmagnetic materials to greatly reduce the exchange interaction and magnetostatic interaction between the discrete magnetic elements.

7. The magnetic storage system of claim 6 wherein the spacing between two neighboring discrete magnetic elements is larger than 5 nm to reduce the exchange interaction between the two neighboring discrete magnetic elements.

8. The magnetic storage system of claim 1 wherein the write head has a size either smaller or larger than a size of the discrete magnetic elements.

9. The magnetic storage system of claim 1 wherein the non-magnetic substrate has a shape of either a disk, a rectangle or a square.

10. The magnetic storage system of claim 1 wherein the plurality of single domain elements are substantially perpendicular to the non-magnetic substrate for vertical recording.

11. The magnetic storage system of claim 1 wherein the plurality of single domain elements are substantially parallel to a surface of the non-magnetic substrate for longitudinal recording.

12. The magnetic storage system of claim 1 wherein the plurality of discrete magnetic elements are vertical pillars.

13. The magnetic storage system of claim 1 wherein the plurality of discrete magnetic elements are horizontal bars.

14. The magnetic storage system of claim 1 wherein a magnitude of a magnetic field needed to switch the magnetization direction of the quantized magnetization of one of the plurality of discrete magnetic elements is determined by the size and shape of that element.

15. The magnetic storage system of claim 1 wherein a single bit of information is stored using a single discrete single domain magnetic element.

16. The magnetic storage system of claim 1 wherein a single bit of information is stored using a plurality of discrete single domain magnetic elements.

17. The magnetic storage system of claim 1 wherein the plurality of discrete single-domain magnetic elements and the nonmagnetic materials together comprise a magnetic medium, and wherein a surface of the magnetic medium is substantially smooth.

18. The magnetic storage system of claim 1 wherein the plurality of discrete single-domain magnetic elements and the nonmagnetic materials together comprise a magnetic medium, and wherein a top surface of the magnetic medium includes topological variations.

19. The magnetic storage system of claim 1 including non-magnetic material between the plurality of single domain magnetic elements which provides a variation in the magnetic field between the bits whereby the location of each element can be tracked individually.

20. A magnetic storage system for storing magnetically encoded information, comprising:
   a substrate;
   a nonmagnetic material deposited on the substrate;
   a plurality of discrete single-domain magnetic storage elements; wherein the plurality of discrete single-domain magnetic storage elements are embedded in the nonmagnetic material, each single-domain magnetic storage element having one of only two quantized magnetization moments of differing magnetization vector directions and of substantially equal magnitude in the absence of an external magnetic field;
   a write head that sets the magnetization vector direction of one or more of the plurality of discrete single-domain magnetic storage elements in order to store binary information; and
   a read head that reads the binary information by sensing the quantized magnetic moments from one or more of the plurality of discrete single-domain magnetic storage elements.

21. A magnetic storage medium for storing magnetically encoded information, comprising:
   a substrate;
   a nonmagnetic material deposited on the substrate; and
   a plurality of discrete single-magnetic-domain storage elements; wherein the plurality of discrete single-magnetic-domain storage elements are embedded in the nonmagnetic material, each single-magnetic-domain storage element having one of only two quantized magnetization moments of differing magnetization vector directions and of substantially equal magnitude in the absence of an external magnetic field.

22. The magnetic storage medium of claim 21, wherein each discrete single-magnetic-domain storage element has a size and shape substantially equal to the size and shape of other of the plurality of discrete single-magnetic-domain storage elements.

23. The magnetic storage medium of claim 21, wherein the plurality of discrete single-magnetic-domain storage elements include a plurality of layers of ferromagnetic materials or their alloys.

24. The magnetic storage medium of claim 21, wherein each discrete single-magnetic-domain storage element has a small size and preferred shape anisotropy such that each of the discrete single-magnetic-domain storage elements is a single magnetic domain thus providing the two magnetic moments of the storage element which tend to align along a long axis of the storage element in the absence of an external magnetic field.

25. The magnetic storage medium of claim 21, wherein a minimum spacing between any two neighboring discrete single-magnetic-domain storage elements is larger than about 5 nm in order to reduce the exchange interaction between the two neighboring discrete single-magnetic-domain storage elements.

26. The magnetic storage medium of claim 21, wherein the plurality of discrete single-magnetic-domain storage elements are pillars each having their longest axis oriented perpendicular to a surface of the substrate closest to the plurality of discrete single-magnetic-domain storage elements.

27. The magnetic storage medium of claim 21, wherein the plurality of discrete single-magnetic-domain storage elements are bars each having their longest axis oriented parallel to a surface of the substrate closest to the plurality of discrete single-magnetic-domain storage elements.

28. The magnetic storage medium of claim 21, wherein each single bit of information is stored using a plurality of discrete single-magnetic-domain storage elements.

29. The magnetic storage medium of claim 21, wherein the plurality of discrete single-magnetic-domain storage elements and the nonmagnetic materials together comprise a magnetic medium, and wherein a surface of the magnetic medium is substantially smooth.

30. The magnetic storage medium of claim 21, including non-magnetic material between the plurality of discrete single-magnetic-domain storage elements which provides a variation in the magnetic field between the bits that allows the location of storage elements to be tracked.

31. The magnetic storage medium of claim 21, wherein each one of the plurality of discrete single-magnetic-domain storage elements is located at a predetermined location in a pillar array such that successive bits of information are stored in successive elements in the array on a one-to-one basis.

* * * * *